(12) United States Patent
Robinson et al.

(10) Patent No.: US 11,920,570 B1
(45) Date of Patent: Mar. 5, 2024

(54) ENHANCED OCEAN THERMAL ENERGY CONVERSION (EOTEC) SYSTEM

(71) Applicant: EXCIPIO ENERGY, INC., Houston, TX (US)

(72) Inventors: Roy E. Robinson, Houston, TX (US); Georg E. Engelmann, Houston, TX (US)

(*) Notice: Subject to any disclaimer, the term of this patent is extended or adjusted under 35 U.S.C. 154(b) by 4 days.

(21) Appl. No.: 18/099,548

(22) Filed: Jan. 20, 2023

(51) Int. Cl.
*F03G 7/05* (2006.01)
*F03G 7/04* (2006.01)

(52) U.S. Cl.
CPC ............. *F03G 7/05* (2013.01); *F03G 7/045* (2021.08); *F03G 7/047* (2021.08)

(58) Field of Classification Search
CPC ............ F03G 7/045; F03G 7/047; F03G 7/05
USPC ............................................ 60/641.6–641.7
See application file for complete search history.

(56) References Cited

U.S. PATENT DOCUMENTS

| | | |
|---|---|---|
| 5,513,494 A | 5/1996 | Flynn et al. |
| 6,494,251 B2 | 12/2002 | Kelley |
| 6,619,066 B1 | 9/2003 | Kaneo |
| 8,117,843 B2 | 2/2012 | Howard et al. |
| 9,038,390 B1* | 5/2015 | Kreuger ................. F03G 6/005 60/670 |
| 2007/0289303 A1 | 12/2007 | Prueitt |
| 2010/0139272 A1* | 6/2010 | Howard ................. F24V 50/00 290/52 |

* cited by examiner

*Primary Examiner* — Laert Dounis
(74) *Attorney, Agent, or Firm* — Dileep Rao

(57) ABSTRACT

An improved Ocean Thermal Energy Conversion system (called OTEC) is presented herein by the addition of a closed heat transfer loop. In conventional OTEC, warm surface waters are used to vaporize a working fluid for use in a turbine, and cold waters are then brought up from deep water, typically more than 1000 meters, to condense the working fluid. In simple terms conventional OTEC brings the cooling potential up to the warm surface. The disclosed OTEC system brings the heat down to the deep cold waters by using a separate heat transfer fluid loop. We refer to this as Enhanced OTEC or E-OTEC. A key feature of the process is descending to the depths as a dense fluid and returning to the surface as a much lower density fluid, thereby gaining a gravitational boost in pressure and temperature. This leads to several technological, performance, and economic advantages over prior art.

4 Claims, 3 Drawing Sheets

ENHANCED OCEAN THERMAL ENERGY CONVERSION (EOTEC) SYSTEM

CROSS-REFERENCE TO RELATED APPLICATIONS

N/A

BACKGROUND OF THE INVENTION

The present disclosure generally relates to enhanced Ocean Thermal Energy Conversion systems.

Ocean Thermal Energy Conversion, commonly known as OTEC, was invented in the 1890's as a potential energy conversion system that ran on the temperature difference between warm surface waters and the colder depths of oceans, seas, and lakes. The power is generated by a thermodynamic cycle that includes flashing a working fluid in an evaporator that typically uses the warm surface waters of tropical oceans as a heat source. The vaporized working fluid is then passed through a turbine generator and the exiting working fluid is sent to a condenser which uses cold waters drawn from deep waters, which are generally brought to the surface through a large diameter pipe riser. Upon exit from the condenser, the working fluid is then pumped up to working pressure and sent back to the evaporator. This is an example of a classic Rankine Cycle typically used for OTEC power generation. In principle it is a baseload quality, continuously operating renewable energy system, and one that is especially suited to tropical island nations. Small sub-megawatt systems have been built and successfully operated since the 1920's.

Despite OTEC's potential as a continuously available power source, OTEC has not been deployed at large scale, with the largest working system being a test unit rated at 250 kW. The reasons for this are well known in the art. A typical system will use warm surface waters found in the tropics of between 18 degrees Celsius and 30 degrees Celsius, and cold deep-water temperatures of 4 degrees Celsius to 8 degrees Celsius. Using the Carnot Cycle equations this means that the theoretical maximum thermal efficiency of the Rankine cycle being used is limited to between 4.1% and 8.5% with the realized operating efficiencies being lower, between 3% and 6%. This low efficiency necessitates the handling of very large volumes of water through the heat exchangers. This is not by itself the main problem hindering large scale OTEC deployment. The problem with every attempt at a system large enough to make multi-megawatt quantities of power is that the cold waters need to be drawn up from depths greater than 1000 meters. To do this, at the volumes of water required, leads to cold water riser pipes up to 14 meters in diameter being considered in system designs. Constructing a pipe that will meet the flow requirements for an extended period has proven to be beyond current offshore industry capabilities, and the cold water riser is the subject of many patented attempts to solve this problem.

The objective of this invention is to overcome two functional shortcomings of OTEC, the requirement for a large diameter cold water riser, and the low temperature differential typical of the water column, thereby making it a functional and techno-economically feasible technology for generating multi-megawatt scale renewable power.

SUMMARY OF THE INVENTION

The Enhanced OTEC system being proposed uses the addition of a heat transfer fluid loop which will have the dual effect of reducing the deepwater riser pipe diameters to what is within the offshore industry's current technological capabilities, while simultaneously raising the temperature of the hot side of the evaporator to well above the ambient water temperature. The resulting system replaces one overly large riser with two smaller more robust risers that are parts of the heat transfer loop, while increasing the potential thermal efficiency of the OTEC system by increasing the hot side temperature available.

The heat transfer fluid can be any gas that exhibits Joule-Thomson heating on increased pressure at the pressure ranges considered. While any gas could be used for the heat transfer fluid in the examples here carbon dioxide was assumed.

The Rankine power cycle used can be any of those known to the art, but instead of being mounted onshore, on the water surface or just below the surface, for this disclosure the power cycle and associated equipment can be mounted subsea, at least to the depth required for access to the cold water required by the condenser. For purposes of illustration a conventional closed cycle OTEC system assuming anhydrous ammonia as the working fluid, but any suitable low temperature organic Rankine cycle fluid could be used.

The surface portion of the Enhanced OTEC (EOTEC) system will consist of a warm water to heat transfer fluid heat exchanger, which will add energy to the heat transfer fluid prior to the heat transfer fluid entering the pressure step up equipment, which may be a pump or compressor depending on the specific fluid used and the pressure and temperature at which it leaves the warm water exchanger. The heat transfer fluid will exit the heat transfer compressor at a high pressure and, in the case of carbon dioxide used to model the system, in a dense phase, and a correspondingly elevated temperature. The warm water exhaust will be discharged at a depth sufficient to avoid environmental thermal impacts. A key aspect is that the mass flow rate of the heat transfer fluid is a fraction of the cold water mass flowrate in a conventional OTEC system would be, about $\frac{1}{100}$ the mass flow rate in the example used.

The heat transfer fluid will then enter the down riser after exiting the heat transfer compressor, in the process of descending the riser the heat transfer fluid will increase in pressure as it descends, the pressure increase caused by its own density and gravitational forces and will also increase the temperature due to Joule-Thomson effects. Upon reaching the on-bottom or deepwater Rankine power cycle equipment, the heat transfer fluid will enter the working fluid evaporator 7. The temperature of the heat transfer fluid on the hot side of the evaporator will depend on the specific gas chosen, the water depth, the exit temperature at the heat transfer compressor, and any heat loss through the down riser. While the heat transfer fluid conditions will vary, in an example using carbon dioxide as the heat transfer fluid, at a depth of 2000 meters, the pressure increased by more than 30% over the exit pressure at the heat transfer fluid compressor, and the temperature of the heat transfer fluid was greater than 100 degrees Celsius entering the evaporator. The efficiency of the working fluid evaporator will be improved due to the greater log mean temperature difference (LMTD) across the working fluid evaporator. For example, at 100 deg Celsius the potential Carnot efficiency is improved to more than 25% vs the 8.5% maximum of a Conventional OTEC.

The working fluid is then sent through the turbine which in turn powers the take-off generator or pump, before proceeding to the working fluid condenser, though which flows the cooling water from the cold water pump co-located with the Rankine power cycle equipment. The required length of cold water piping is reduced to only that required to keep the seawater intake sufficiently clear of the seabed. The cold water stream exiting the condenser will exit at an elevated temperature relative to the ambient water, but at a sufficient flow rate to ensure the thermal pollution is negligible due to dispersion.

The heat transfer fluid will exit the evaporator at an elevated temperature compared to the ambient water and still at high pressure. In one embodiment of the system, this warm high-pressure gas will be sent through a turbo expander generator to recapture a portion of the compression energy as well as to lower its temperature. Under the right conditions this expansion can drop the temperature of the heat transfer fluid to below the ambient seawater temperature of 4 degrees Celsius. When this occurs the heat transfer fluid will be directed through a second subsea heat exchanger, acting as a regenerator, common in Rankine cycle devices. The Subcooled gas will pick up energy from both the colder deeper water and as it ascends through the warmer surface water as it traverses the water column in the up riser. Despite these energy gains, as the gas expands ascending the up riser it will be further subcooled. Insulation may be required on the up riser to prevent the formation of ice on the exterior of the pipe but will be heat transfer fluid specific. It is important to note that the reduced density of the lower pressure gas in the up riser compared to the pressure gains in the down riser due to the fluid's own weight are not balanced, and result in a net energy gain into the system due to gravitational head accumulated in the down riser. At the top of the up riser, it is expected that the heat transfer fluid could be at temperatures as low as −10 degrees Celsius. At this point the heat transfer fluid will enter the heat transfer fluid heater, which is a heat exchanger using warm water on one side and the heat transfer fluid on the other. Icing of the water inside the heat transfer fluid heater is prevented due to the high flow rate of warm water. As with the evaporator, the increase in temperature difference across the heat transfer fluid heater compared to conventional OTEC systems will increase the thermal efficiency of the system.

DETAILED DESCRIPTION OF THE INVENTION

Before explaining the present disclosure in detail, it is to be understood that the present disclosure is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only and are not intended to be limiting.

Specific structural and functional details disclosed herein are not to be interpreted as limiting, but merely as a basis of the claims and as a representative basis for teaching persons having ordinary skill in the art to variously employ the present embodiments. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The word "about", when referring to values, means plus or minus 5% of the stated number.

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

When methods are disclosed or discussed, the order of the steps is not intended to be limiting, but merely exemplary unless otherwise stated.

Accordingly, the scope of protection is not limited by the description herein, but is only limited by the claims which follow, encompassing all equivalents of the subject matter of the claims. Each and every claim is hereby incorporated into the specification as an embodiment of the present disclosure. Thus, the claims are a further description and are an addition to the embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

Figure 1:
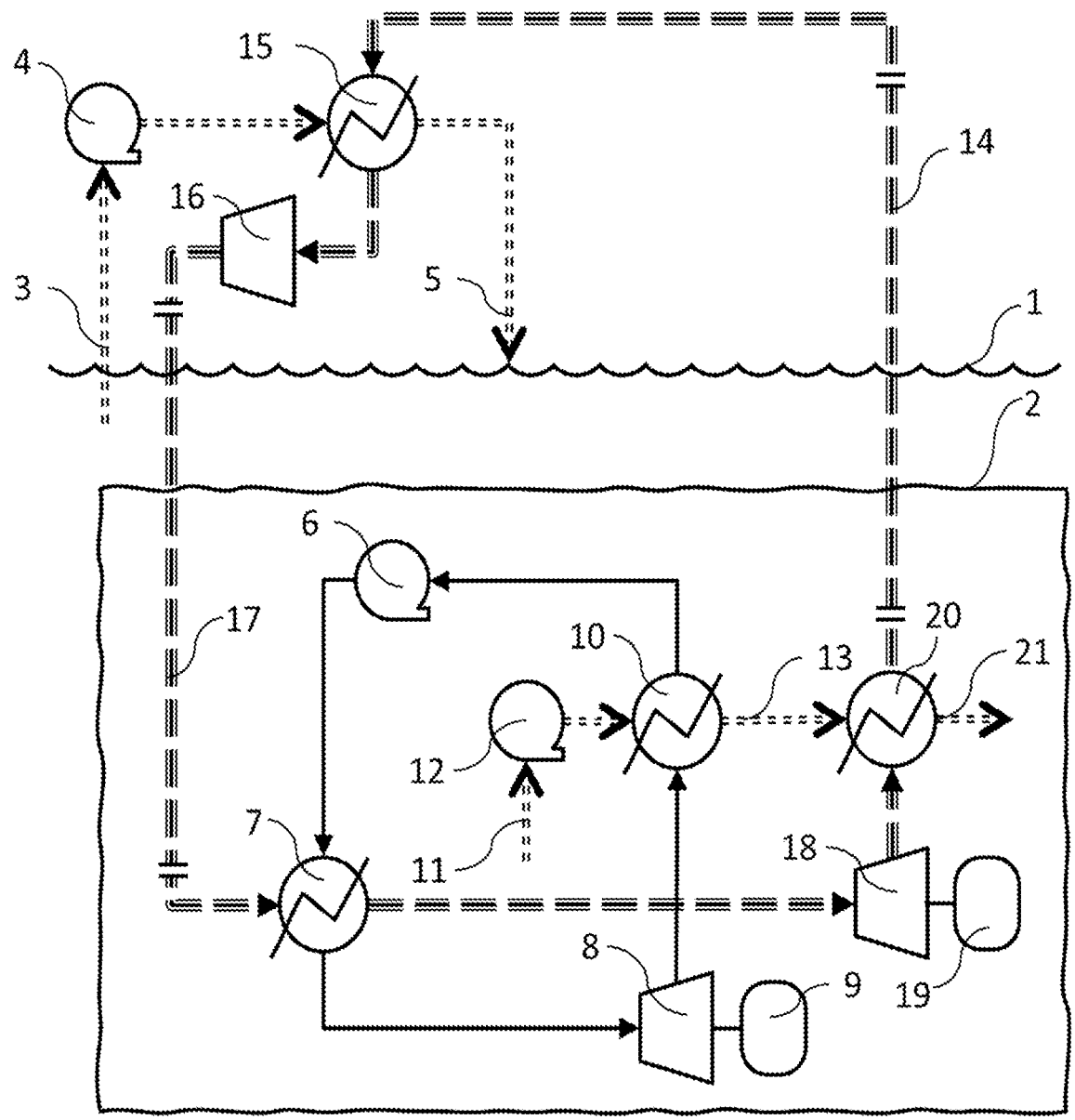
FIG. 1 is the preferred embodiment of the system and shows the Enhanced Ocean Thermal Energy Conversion (EOTEC) system.

FIG. 1 is the preferred embodiment of the system and shows the Enhanced Ocean Thermal Energy Conversion (EOTEC) system. This new system is divided into two main sections, surface mounted equipment near Sea Level 1, which can be onshore or mounted on a fixed or floating platform, and Seabed or Deepwater 2 which can be on the bottom of the body of water or mounted on fixed or floating structure at a desired depth sufficient to encounter the required cold water temperature, generally taken to be 8 degrees Celsius or less. Typically, this is deeper than 1000 meters, however the desired depth will be dictated by water temperature.

The Sea Level 1 portion of the system consists of the Warm Water Intake 3 piping which feeds the Warm Water Pump 4, which in turn feeds Heat Transfer Fluid Heater 15 before being returned to the body of water via the Warm Water Discharge 5. Also, at or near Sea Level 1 is the Heat Transfer Fluid Compressor 16 located on the outlet of the Heat Transfer Fluid Heater 15. The outlet from the Heat Transfer Fluid Compressor 16 feeds into the top of the Down Riser 17 which carries the heat transfer fluid down to the Seabed or Deepwater 2 portion of the system.

The Seabed or Deepwater 2 portion of the system consists of the lower portion of the heat transfer loop and the OTEC power cycle equipment. The hot heat transfer fluid via the Down Riser 17 flows into and provides the heat source for the Working Fluid Evaporator 7. From there the heat transfer fluid flows to the Heat Transfer Loop Turbo Expander 18, which provides motive force to the Heat Transfer Loop Power Take-Off 19, and where some of the energy imparted by the Heat Transfer Fluid Compressor 16 is recovered. The heat transfer fluid then runs through the Heat Transfer Fluid Regenerator 20 where it is warmed by the outflow from the Working Fluid Condenser 10 via the Condenser Cold Water Discharge 13 with further piping used to provide the Secondary Cold Water Discharge 21. The heat transfer fluid then enters the Up Riser 14, completing the heat transfer loop.

The Rankine cycle equipment is located entirely within the Seabed or Deepwater 2 portion of the system. The power loop consists of the Working Fluid Evaporator 7, where the working fluid picks up energy from the heat transfer fluid. The working fluid then enters the Working Fluid Turbine 8 which provides the motive force for the Power Take-Off 9. The working fluid flows from there to the Working Fluid Condenser 10 where it is cooled by cold water supplied by the Cold Water Pump 12 to a liquid state prior to entering the Working Fluid Pump 6. The Cold Water Intake 11 piping will be used to ensure no debris enters the cooling systems or Working Fluid Condenser 10. A closed cycle OTEC system is shown but the invention could be applied to any OTEC power cycle, including Open Cycle.

The configuration of the Sea Level 1 portion of the system is common to all embodiments, but the Seabed or Deepwater 2 portion of the system is configurable to allow for optimizing system functionality to the local resource conditions.

Figure 2:
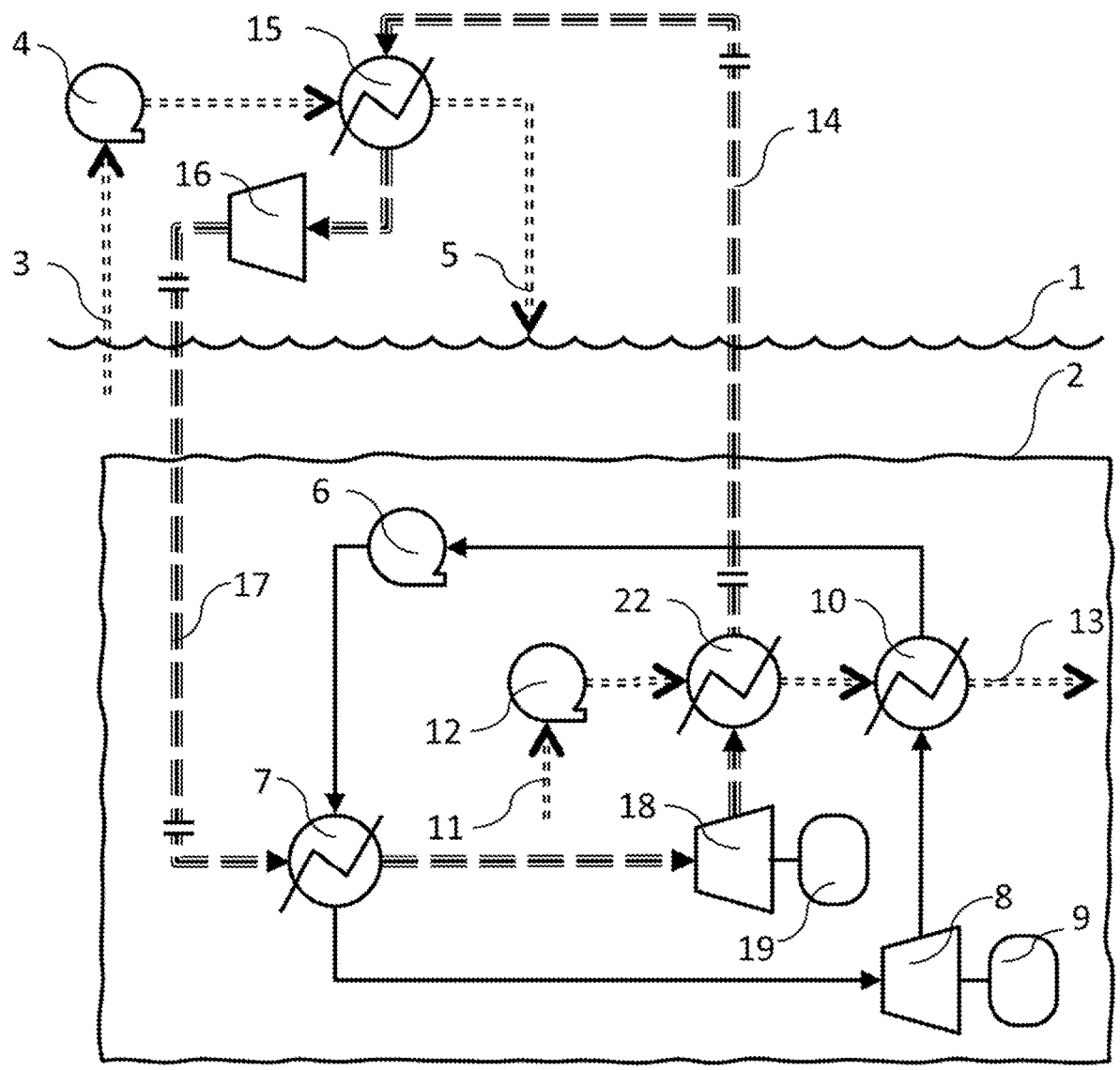
FIG. 2 is an alternate embodiment of the system for locations where access sufficiently cold waters is restricted.

FIG. 2 is an alternate embodiment of the system and shows the same E-OTEC system as FIG. 1 with the only revision being the replacement and relocation of the Heat Transfer Fluid Regenerator 20 to before the Working Fluid Condenser 10 where it becomes the Cold Water Chiller 22 in the event the waters in the immediate vicinity of the OTEC Power Loop are not sufficiently cool, this will both warm the expanded heat transfer fluid and lower the seawater temperature going into the Working Fluid Condenser 10. In this configuration the Heat Transfer Fluid Regenerator 20 and Secondary Cold Water Discharge 21 are eliminated.

Figure 3:
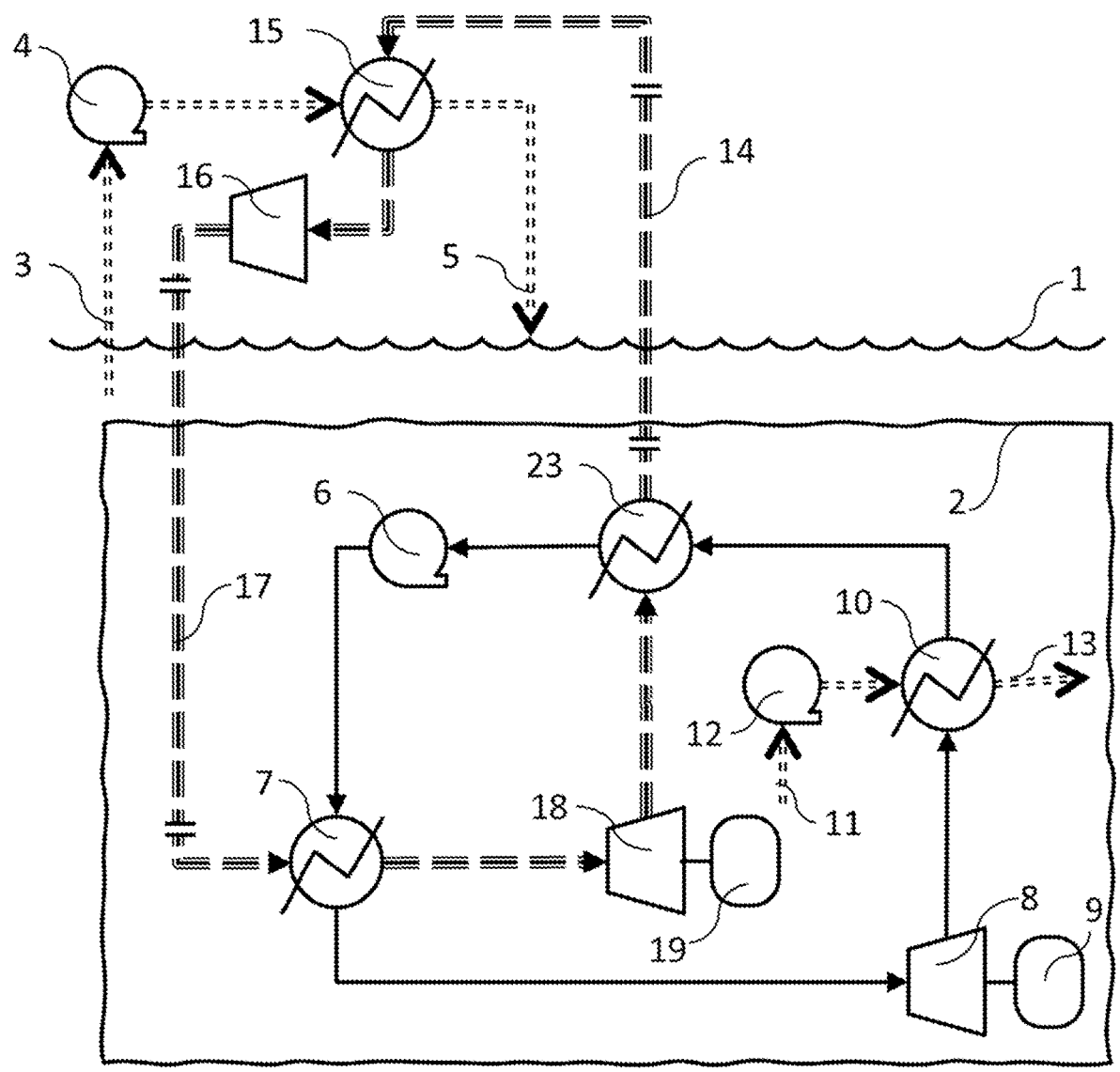
FIG. 3 is an alternate embodiment of the system for use with working fluids that require more subcooling than the ambient cold water can provide.

FIG. 3 is an alternate embodiment of the system and shows the same E-OTEC system as FIG. 2 with the Cold Water Chiller 22 of FIG. 2 relocated to the working fluid loop, and now acting as a Working Fluid Second Stage Condenser 23. This configuration is envisioned for systems using working fluids that require subcooling below ambient water temperatures.

For those not familiar with the art, conventional OTEC works by using warm water to flash evaporate a working fluid, pass it through a turbine, and uses cold waters drawn up from the depths to condense the working fluid before it is pumped around again. Conventional OTEC is limited in its deployable range by the requirements for warm surface waters, with 18 degrees Celsius taken as a minimum temperature difference, and access to cold, less than 8 degrees Celsius, water. Because it has such a low temperature differential to drive the process, the amounts of water, warm and cold, which need to be moved are large. Design flow rates of 50000 kg/sec, using water as the heat transfer fluid, for example, are necessary for the 11 MW (net) system designed by the National Renewable Energy Laboratory. To date the commercial failure of OTEC centers on the size of the required cold water pipe, with diameters of up to 14 meters being considered.

The primary change in the Enhanced Ocean Thermal Energy Conversion (E-OTEC) system is the replacement of the cold water down pipe, which brings cold waters from the depths of the body of water up to the Rankine cycle condenser, with two riser pipes that carry a heat transfer fluid down to, and up from, the power generation system in a heat transfer loop.

The heat transfer fluid may be any gas that exhibits dense phase or supercritical behavior with a positive Joule-Thomson effect at the working pressure and temperature. For purposes of illustration, carbon dioxide was assumed, but other gases could be used.

The E-OTEC system moves the power generating equipment to a depth sufficient to directly access ambient water temperatures of a low enough temperature to condense the working fluid sufficiently for use in the Rankine cycle. The exact cold water temperature requirement will vary with the specific working fluid used, and the amount of heat available in the Rankine cycle evaporator. For purposes of illustration, it is assumed the subsea equipment will be mounted on the bottom of the body of water, but in very deep waters it may be more cost effective to suspend the equipment some distance above the bottom via a floating or fixed structure.

The use of the heat transfer fluid loop has multiple effects that increase the overall system thermal efficiency, resulting in an increased net power output compared to a similarly sized conventional OTEC system.

Starting with the heat transfer fluid heating in the Heat Transfer Fluid Heater 15, where the entering fluid will be at a very low temperature due Joule-Thomson cooling of the gas as it ascends the return riser due to expansion as the pressure in the line drops. This results in a higher log-mean thermal gradient across the heat exchanger than is typical for an OTEC system. In conventional OTEC systems the warm water side of the heat exchanger is between 18 degrees Celsius and 30 degrees Celsius, and the same is assumed here. The working fluid temperature in a conventional OTEC system is approximately 10 degrees Celsius, giving a maximum temperature gradient of 20 degrees Celsius. However, using carbon dioxide as the heat transfer fluid in models of the E-OTEC systems, the heat transfer fluid enters the Heat Transfer Fluid Heater 15 at temperatures as low as −10 degrees Celsius, for a thermal gradient of 40 degrees.

There is no icing risk in the exchanger due to the very high mass flow rate of warm water required compared to the mass flow rate of the heat transfer fluid. In the modeled case the ratio of the working fluid mass flow rate to the mass flow rate of the warm water is nearly 100:1, as is typical of any OTEC system. The high gradient results in both a cooler water discharge temperature and therefore more energy being absorbed by the heat transfer fluid than would normally go into the working fluid in a conventional OTEC system.

The warmed heat transfer fluid from the Heat Transfer Fluid Heater 15, which is also at its lowest pressure in the system, then goes into the Heat Transfer Fluid Compressor 16 where its pressure is raised to that required to be in a dense phase. The process of compression also heats the fluid due to Joule-Thomson effects, the effect being to amplify the temperature above what was gained from the heat contained in warm surface water alone.

This dense hot gas then enters the Down Riser 17 and flows downward, typically 1000 meters or more. By selecting a compressor pressure high enough that the pressure increase due to hydrodynamic head is greater than any frictional losses, the pressure in the heat transfer fluid increases as it descends. While there will be some heat loss through the pipe, it is assumed that an insulated pipe will be used for the Down Riser 17 and that combined with the short transit time means that there will be a gain in temperature as well as pressure, again due to Joule-Thomson effects.

The end result is that at the bottom of the Down Riser 17 where the fluid enters the Working Fluid Evaporator 7 the heat transfer fluid is a high pressure and very high temperature. In a typical OTEC system, as was pointed out above, the thermal gradient into the working fluid is not more than 40 degrees Celsius with the hot side of the exchanger not usually higher than 30 deg Celsius. In this E-OTEC system that thermal gradient will be much higher. Modeling the system with carbon dioxide as the heat transfer fluid, the temperature was as high as 110 degrees Celsius, giving a 100 degree Celsius thermal gradient.

The high temperature results in the working fluid gaining more energy, which is then given up in the Rankine cycle turbine. The result is up to twice the gross power output of a comparably sized conventional OTEC system.

The heat transfer fluid exits the Working Fluid Evaporator 7 at high pressure and significantly reduced temperature. To recover the energy used in compressing it to a dense phase fluid, the heat transfer fluid is passed through the Heat Transfer Loop Turbo Expander 18. The energy recovered will be a significant portion of the compressor power, and the heat transfer fluid will exit at relatively low pressure and much lower temperature, cause by Joule-Thomson effects.

This supercooled fluid will then be passed through the Heat Transfer Fluid Regenerator 20, which will pull recovery heat from the exit side of the Working Fluid Condenser 10. Even with this added energy, the heat transfer fluid will be at or below ambient water temperature and at a relatively low pressure when it enters the Up Riser 14.

The heat transfer fluid will be at a much reduced density in the Up Riser 14 and therefore gravitational head losses will be less than the gains in the Down Riser 17. This results in a net energy gain for the system The fluid in the riser will be at low temperature, and to prevent external icing the Up Riser 14 may need to be insulated, but that will depend on the exact fluid selected and ambient conditions. It is possible that the heat transfer fluid will pick up heat from the ambient water as it rises, but that gain will not overcome the cooling from the Joule-Thompson cooling effects as the pressure drops in the pipelines. It is this expansion and cooling that gives the cold temperature conditions already described at the beginning of this description.

The working fluid modeled was ammonia, but any fluid used in conventional OTEC system will work and by virtue of the elevated hot side temperature, other fluids may perform better, and the system is expressly not limited to ammonia cycles.

After passing through the turbine portion of the power loop, the working fluid is sent to the Working Fluid Condenser 10, which uses ambient water, forced through the condenser by a pump. The temperature of the cold water must be sufficiently low to condense the working fluid at the turbine exit pressure.

In the event that the ambient temperature is not sufficiently low, a different embodiment of the design shown in FIG. 3 would use the supercooled fluids exiting the Heat Transfer Loop Turbo Expander 18 to aid in condensing the working fluid.

The combination of heat amplification on the hot side of the evaporator and ability to lower the temperature entering the cold water side of the condenser, will allow the system to work in waters where conventional OTEC could not, thereby extending the applicable geographical regions of OTEC.

While the present disclosure emphasizes the presented embodiments and Figures, it should be understood that within the scope of the appended claims, the disclosure might be embodied other than as specifically enabled herein.

What is claimed is:

1. A method of generating power comprising:
   accessing a body of water having a temperature proximate a surface greater than a heat transfer fluid;
   adding energy from the body of water to the heat transfer fluid proximate to the surface of the body of water;
   pressurizing the heat transfer fluid;
   transporting the heat transfer fluid to a desired depth within the body of water;
   transferring energy from the heat transfer fluid to a working fluid;
   passing the working fluid through a turbine, thereby causing the turbine to generate power;
   cooling the working fluid with ambient water at the desired depth from the body of water;
   expanding the heat transfer fluid through a heat transfer loop turbo expander to generate power; and
   transporting the heat transfer fluid back to the surface for reuse.

2. The method of claim 1, further comprising the step of heating the heat transfer fluid after expansion in the heat transfer loop turbo expander using a cold water discharge.

3. The method of claim 1, further comprising the step of pre-chilling the ambient water prior use in a working fluid condenser by use of a heat exchanger and subcooled heat transfer fluid post the heat transfer loop power recovery turbine expansion.

4. The method of claim 1, further comprising the step of adding a working fluid second stage condenser to a working fluid loop using subcooled heat transfer fluid post the heat transfer loop power recovery turbine.

* * * * *